United States Patent
Brown-Tsai et al.

(10) Patent No.: US 9,701,560 B2
(45) Date of Patent: Jul. 11, 2017

(54) MUFFLE GAP SEAL FOR GLASS LAMINATE MACHINE

(71) Applicant: Corning Incorporated, Corning, NY (US)

(72) Inventors: Jufe Adam Brown-Tsai, Lindley, NY (US); Frank Coppola, Horseheads, NY (US); Bruno Le Gallic, Fontainebleau (FR); Vladislav Yuryevich Golyatin, Avon (FR); Shaan Leslian Yeershen Polius, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 341 days.

(21) Appl. No.: 14/446,798

(22) Filed: Jul. 30, 2014

(65) Prior Publication Data

US 2015/0033797 A1 Feb. 5, 2015

Related U.S. Application Data

(60) Provisional application No. 61/860,478, filed on Jul. 31, 2013.

(51) Int. Cl.
 *C03B 17/06* (2006.01)
 *F16J 15/00* (2006.01)
 *F16J 15/02* (2006.01)

(52) U.S. Cl.
 CPC .......... *C03B 17/064* (2013.01); *F16J 15/002* (2013.01); *F16J 15/022* (2013.01)

(58) Field of Classification Search
 CPC ........ F16J 15/002; F16J 15/006; F16J 15/008; F16J 15/02; F16J 15/10; F16J 15/102; F16J 15/104; C03B 17/064
 See application file for complete search history.

(56) References Cited

U.S. PATENT DOCUMENTS

| | | | | |
|---|---|---|---|---|
| 4,174,842 A | * | 11/1979 | Partus | C03B 37/029 264/85 |
| 7,814,767 B2 | * | 10/2010 | Roba | C03B 37/0124 219/649 |
| 2005/0057006 A1 | * | 3/2005 | Gassner | F24C 15/021 277/650 |
| 2007/0190340 A1 | | 8/2007 | Coppola et al. | |
| 2010/0212360 A1 | | 8/2010 | Delia et al. | |
| 2011/0203321 A1 | | 8/2011 | De Angelis et al. | |
| 2012/0198784 A1 | | 8/2012 | Shaw | |

FOREIGN PATENT DOCUMENTS

WO 2012026136 A1 3/2012
WO 2014018838 A2 1/2014

OTHER PUBLICATIONS

European Patent Office; International Search Report; Mail Date: Nov. 10, 2014; pp. 1-6.

* cited by examiner

*Primary Examiner* — Gilbert Lee

(57) ABSTRACT

A flexible seal positioned between two muffles of a glass laminate fusion draw machine comprises, in order from the interior to the exterior of the muffles, a radiation shield comprising overlapping rows of refractory material, a thermal seal comprising a blanket of temperature resistance material, and an air seal comprising a sheet of high temperature elastomeric material. The seal may further comprising a secondary radiation shield positioned between the thermal seal and the air seal.

6 Claims, 2 Drawing Sheets

MUFFLE GAP SEAL FOR GLASS LAMINATE MACHINE

CROSS-REFERENCE TO RELATED APPLICATIONS

This application claims the benefit of priority under 35 U.S.C. §119 of U.S. Provisional Application Ser. No. 61/860,478 filed on Jul. 31, 2013, the content of which is relied upon and incorporated herein by reference in its entirety. This application is related to U.S. Provisional Application Ser. No. 61/678,218 filed on Aug. 1, 2012, also filed as PCT Application No. PCT/US13/53357.

BACKGROUND

The disclosure relates to a glass fusion draw technology, and more particularly to a apparatus for sealing a gap between a clad muffle and a core muffle in a Laminate Fusion Draw Machine (LFDM).

SUMMARY

The present disclosure provides for a flexible seal assembly positioned between two muffles, such as between two muffles of a glass laminate fusion draw machine. The flexible seal assembly includes a radiation shield, a thermal seal, and an air seal.

The radiation shield desirably comprises overlapping, mutually non-contacting rows of refractory material, which are desirably in the form of non-contacting interlaced rows of refractory bricks.

The thermal seal desirably comprises a blanket of temperature resistant material, and the blanket may desirably be formed of a refractory fiber material encapsulated in a fabric formed of a refractory material, such as alumina silicate.

The air seal desirably comprises a sheet of high temperature (that is, high-temperature-resistant) elastomeric material, such as silicone.

The seal assembly may also desirably include a secondary radiation shield positioned between the thermal seal and the air seal. The secondary radiation shield may comprise a flexible metal sheet having folds therein.

The seal is desirably positioned between two muffles of a glass laminate fusion draw machine, and the three parts a desirably arranged as follows, in order from the interior to the exterior of the muffles, (1) the radiation shield, (2) the a thermal seal, and (3) the air seal.

The resulting three part seal provides thermal protection and impermeability to the gap region between two muffles via the three separate parts a radiation shield, a thermal seal, and an air seal which mechanically function independently of each other. These separate seal parts are separately attached to the two muffles and together provide the benefits of thermal separation between the inside or firebox side of the muffles and the outside or atmospheric side, with no leaks, and with the capability of making any small movements that might be required, up to a full six degrees of relative freedom of motion. A solid insulation cannot provide this flexibility without repacking after every relative move of the muffles. The seal of the present disclosure thus permits desired movement between two muffles without upsetting the parts of the glass sheet forming process the muffles are intended to protect.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Muffles are enclosures providing thermal and atmospheric insulation and protection for principally vertically oriented glass sheets during the fusion draw glass sheet forming process within a Fusion Draw Machine (FDM). Unlike a standard single glass FDM, a Laminate Fusion Draw Machine (LFDM) has at least two adjacent muffles that move independently, in up to a full six degrees of freedom of relative movement, as represented schematically in FIG. 1. As an example only, and not intended as limiting, an upper or first muffle 200 may be moveable in translation in the X and Z axes, and in rotation about the X and Y axes as indicated in the figure, while a lower or second muffle 300 may move in translation in the y direction and in rotation in around the z axis. Regardless of which muffle actually moves in which degree(s) or freedom, or how many total relative degrees of freedom of motion are actually utilized in a particular system, what is generally required that the muffles 200 and 300 be adjustable relative to each other in multiple degrees of freedom of relative movement, possibly in as much as six degrees, three degrees of (relative) translational and three degrees of (relative) rotational freedom of movement. Such relative freedom of movement creates the need for a thermally insulating, airtight seal that is also flexible enough to allow for such movement. Though the total movement required in some or all of the degrees of motion may be small, but each needed degree of freedom must be available over sufficient range to provide a desirable range of manufacturing capability in an LFDM. The present disclosure provides an apparatus answering this need.

Figure 2:
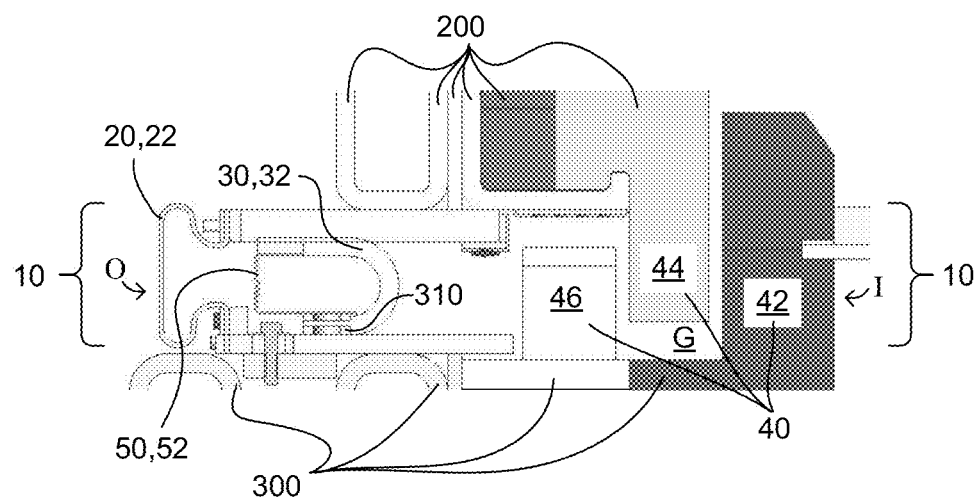
FIG. 2 is a cross-sectional view of a portion of an embodiment of the present disclosure.

Reference will now be made in detail to the present preferred embodiment(s), an examples of which is/are illustrated in the accompanying drawings. Whenever possible, the same reference numerals will be used throughout the drawings to refer to the same or like parts. One embodiment of a seal of the present disclosure is shown in FIG. 2, and is designated generally throughout by the reference numeral 10. The seal 10 is positioned between the structures of an upper muffle 200 and a lower muffle 300, and seals and retains the atmosphere and heat on an inner side of the seal I from escaping to and from being contaminated by atmosphere on an outer side of the seal O.

The seal 10 comprises at least three parts, in order from inside I to outside O: a radiation shield 40, a thermal seal 30, and an atmospheric gas or air seal 20. The radiation shield 40 comprises an overlapping barrier of at least two, desirably at least three rows 42, 44, 46 of refractory brick. The radiation shield 40 shields the thermal seal 30 from the direct radiant heat of the firebox at the interior side I of the seal 10. The rows 42, 44, 46 of brick are arranged along the entire perimeter of the firebox. At least one row of brick 42 (and in this embodiment, row 46 also) extends up from the lower muffle 300 and at least one row 44 extends down from the upper muffle 200. There must be enough overlap between these rows of brick so that the radiation barrier will be maintained over the full range of relative vertical motion between the muffles. There is a gap G around and between the rows 42, 44, 46 large enough to allow for the desired range of relative motion of the muffles. The brick materials, typically insulating fire bricks (IFBs), selected for the radiation shield are intended to reduce the temperature of the inner side of the thermal seal 30 to sustainable levels. Suitable materials for the rows 42, 44, 46 include IFB rated to at least 2800° C. for row 42, and to at least 2600° C. for rows 44 and 46.

Figure 3:
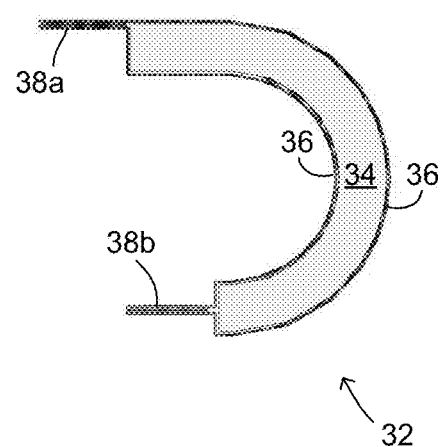
FIG. 3 is a cross sectional view of one aspect of the embodiment of FIG. 2.

The thermal seal 30 comprises a thermal insulating blanket 32 that maintains a continuous C-shape within the muffle gap. This C-shape allows the blanket 32 to extend and compress easily within the relative vertical range of motion of the muffles 200, 300. The size and length of the blanket 32 C-shape is determined by and fabricated at the maximum gap between muffles 200, 300 so as not to create tension when the gap is increased during normal operation of the associated LFDM. As may be seen more easily in the cross section of FIG. 3, the blanket 32 may be comprised in a composite form, including an inner layer 34 of an alkaline earth silicate wool, or of a another suitable material such as alumina fiber, encapsulated within a single layer 36 of an alumina silicate fabric. The blanket 32 desirably further includes flaps 38a and 38b comprising a double layer of fabric only. The blanket 32 is desirably securely fastened to the bottom of the upper muffle 200 and loosely confined by bolts that are attached to the top of the bottom muffle 300. The upper flap 38a of the blanket desirably contains holes to help fasten it to the bottom of the upper muffle 200. The lower flap 38b is desirably connected to a sliding steel frame 310 attached to the top of the bottom muffle 300, and may contain slots to help enable relative x- and y-translation between the muffles.

The air seal 20 comprises a sheet 22 of high temperature resistant elostomeric material, desirably silicone rubber, that continuously surrounds the entire gap between the two muffles 200, 300, and is securely fastened to the top of the lower muffle 300 and to the bottom of the upper muffle 200. The silicone rubber material of the sheet 22 provides high elasticity and the ability to handle the desired range of motion and degrees of freedom required while maintaining the integrity of the air seal 20. The sheet 22 is desirably as thin as possible, for instance ¹⁄₁₆" thick. Depending on the desired range of motion, the durometer of the material of sheet 22 is especially important. Low durometers are preferred for larger movements. The sheet 22 can be a single piece with only one joint or several pieces with an appropriate number of joints. It is fastened tightly to the two muffles 200, 300 on the outside face O of the seal 10. The air seal 20 is maintained during relative movement of the muffles 200, 300 by the stretching and/or the distortion of the silicone rubber material of the sheet 32.

The resulting three part muffle seal 10 provides thermal protection and impermeability to the gap region via the three separate parts (radiation shield 40, thermal seal 30, and air seal 20) which mechanically function independently of each other. These separate seal parts are separately attached to the two muffles 200, 300, and together provide the benefits of thermal separation between the inside I or firebox side of the muffles and the outside O or atmospheric side, with no leaks, and with the capability of making required movements in six degrees of relative freedom of motion. A solid insulation cannot provide this flexibility without repacking after every relative move of the muffles 200, 300. The design of this seal 10 permits the desired movement between the two muffles without upsetting the glass sheet forming process.

Figure 1:
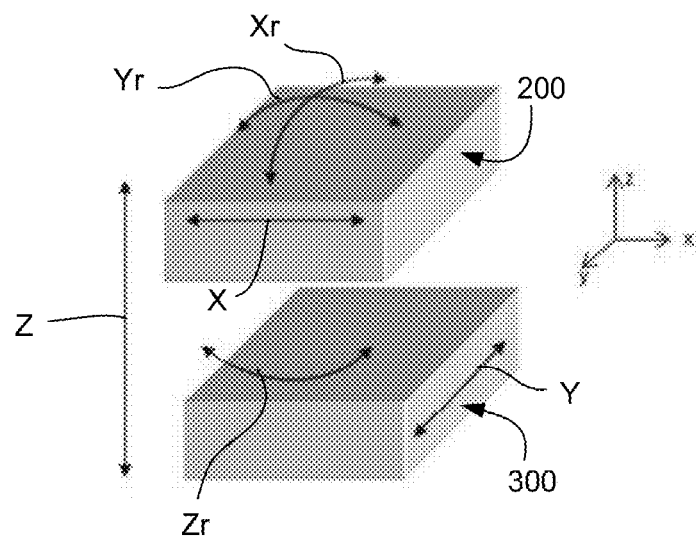
FIG. 1 is a diagrammatic three-dimensional representation of one example of desired motions of two muffles, illustrating six degrees of relative motion between them.

As further seen in FIG. 1, an optional secondary radiation shield 50 may also be included as a part of the seal 10. The secondary radiation shield desirably may be positioned outwardly of the thermal seal, and may desirably comprise a corrugated aluminum sheet 52 attached within the muffle gap in a manner similar to the thermal seal 30, and optionally using the same mounting structures. The secondary radiation shield can provide additional protection for the air seal 20.

It will be apparent to those skilled in the art that other various modifications and variations can be made without departing from the spirit or scope of the claims.

What is claimed is:

1. A flexible seal assembly comprising:
   a radiation shield;
   a thermal seal; and
   an air seal,
   wherein the radiation shield comprises overlapping, mutually non-contacting rows of refractory material, the thermal seal comprises a blanket of temperature resistant material, and the air seal comprises a sheet of high temperature elastomeric material, and further comprising a secondary radiation shield positioned between the thermal seal and the air seal.

2. The seal according to claim 1 wherein the secondary radiation shield comprises a flexible metal sheet having folds therein.

3. The seal according to claim 1 wherein the high temperature elastic material comprises silicone.

4. The seal according to claim 1 wherein the blanket of temperature resistant material comprises a refractory fiber material encapsulated in a fabric formed of a refractory material.

5. The seal according to claim 4 wherein the fabric is an alumina silicate fabric.

6. A system useful for a laminate fusion draw machine comprising:
   an upper muffle;
   a lower muffle;
   a seal assembly according to claim 1.

* * * * *